United States Patent [19]

Seki et al.

[11] 4,072,016
[45] Feb. 7, 1978

[54] METHOD OF RECONSTRUCTING AND RECLAMATION OF RIVER CHANNELS

[76] Inventors: Kiyoshi Seki, 2-15 Komitsu-cho, Ashiya, Hyogo; Ichiro Tomioka, 630-3 Kitabatake, Motoyama-cho, Higashinada, Kobe; Yoshihiko Sawa, 6-22, 1-chome, Higashinoda-cho, Miyakojima, Osaka, all of Japan

[21] Appl. No.: 742,540

[22] Filed: Nov. 17, 1976

[51] Int. Cl.² .......................... E02B 3/04; E02B 3/00
[52] U.S. Cl. ........................................ 61/35; 61/1 R; 61/7
[58] Field of Search ............... 61/1 R, 7, 35, 63, 36 R

[56] References Cited
U.S. PATENT DOCUMENTS

| | | | |
|---|---|---|---|
| 3,408,819 | 11/1968 | Delfosse | 61/35 |
| 3,488,963 | 1/1970 | Hnot | 61/7 |
| 3,568,453 | 3/1971 | Ziegenmeyer | 61/63 |
| 3,625,014 | 12/1971 | Hillen | 61/7 |

*Primary Examiner*—Paul R. Gilliam
*Assistant Examiner*—Alex Grosz

*Attorney, Agent, or Firm*—James R. Cypher

[57] ABSTRACT

A method of reconstructing or reclaiming river channels which are partially filled with soft, slimy sedimentary deposits including industrial wastes which are in a semi-fluid condition or fluidized state comprising the steps of: demarcating a portion of the channel by placing a water tight wall entirely across the channel from bank to bank at an upstream and downstream location; depositing stable fill material adjacent the banks of the channel so as to displace the soft sedimentary deposits and water toward the center of the channel; and treating the displaced soft sedimentary deposit in situ beneath the overlying water so as to stabilize the entire mass.

The channel may be completely reclaimed by pumping out the overlying water after the soft sedimentary deposit has been stabilized and then filling with stable material or stable material may be simply placed on the stabilized mass and the water displaced over the top of the downstream wall or over the adjacent bank.

8 Claims, 12 Drawing Figures

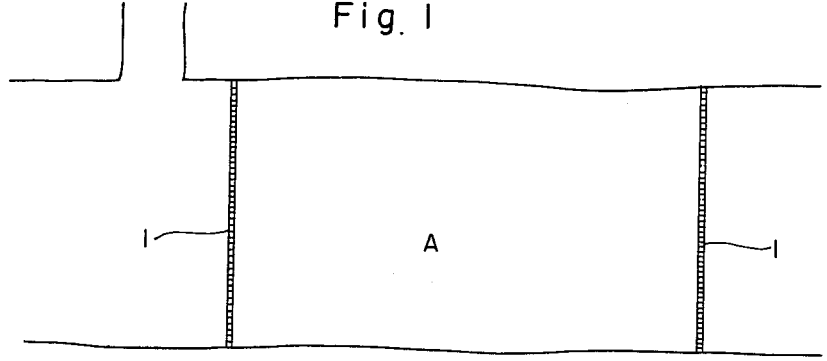
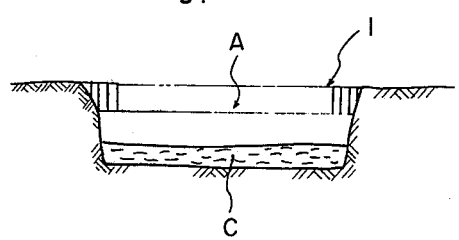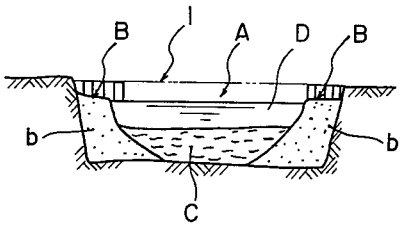
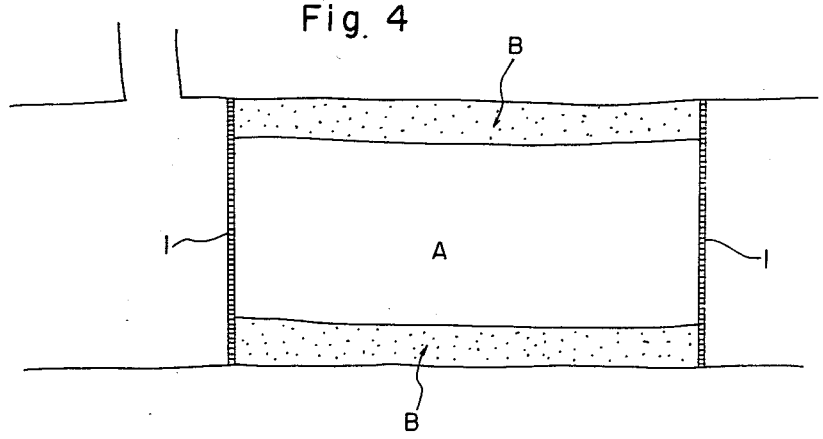

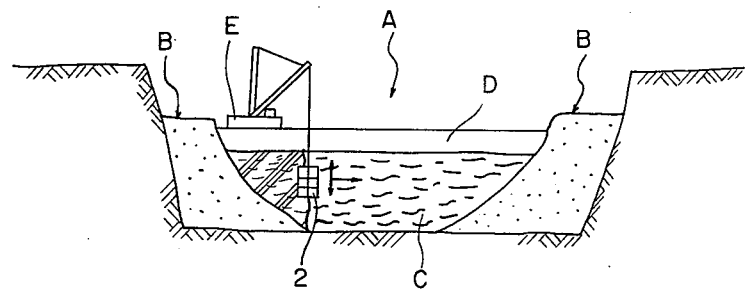
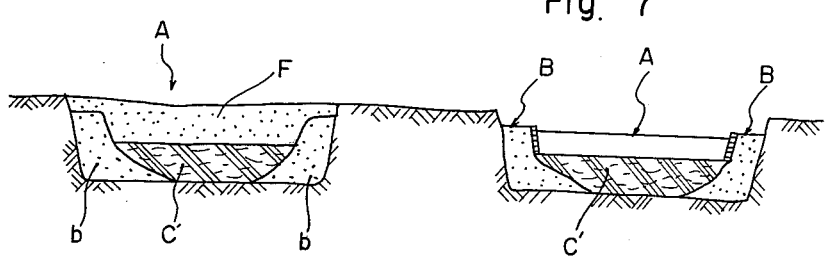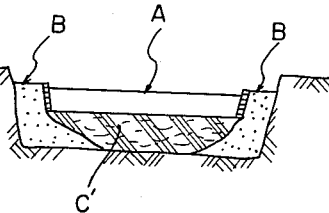
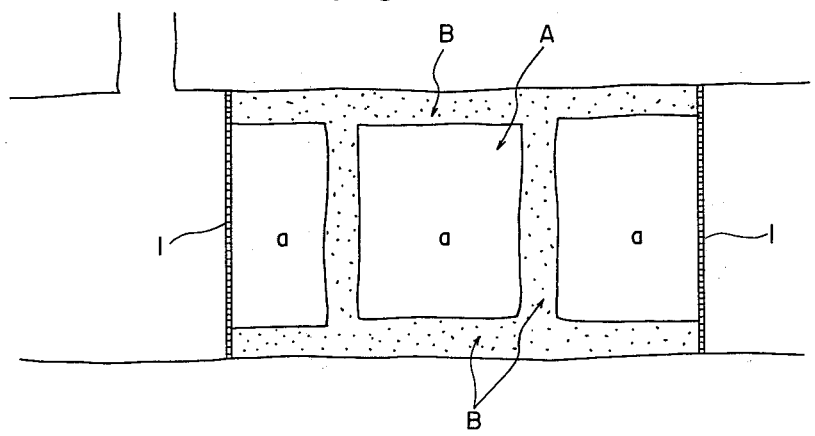

METHOD OF RECONSTRUCTING AND RECLAMATION OF RIVER CHANNELS

BACKGROUND OF THE INVENTION

1. Field of the Invention

This invention relates to a method of displacing, consolidating and stablizing soft sedimentary deposits including industrial wastes in a fluidized state in watercourses or harbors for the purpose of improving the watercourse or completely reclaiming the area by stablizing the sedimentary deposit and filling the area. The area may then be used for most any purpose to which dryland may be used, for example, as parks, golf courses or other type greenzones or for erecting buildings or other structures.

2. Description of the Prior Art

One method of improving waterways or reclaiming land from waterways or harbors and bays filled with soft sediment in a fluidized state either by natural causes or by industrial wastes is to simply deposit sand or other stable material on top of the soft sediment. It is generally difficult to attain stable reclaimed land by such a method which is suitable for building structures. The weight of the sand and buildings will cause settling as the water is displaced from the soft sedimentary deposit. Since such deposits are seldom homogeous or uniform in composition, nor is the thickness of the sediment layer uniform, the reclaimed land will seldom settle in a uniform manner.

The most stable land reclaimed from watercourses and bays can be attained by dredging out the soft sedimentary material and replacing it completely with sand, stable soil, concrete, or other solid material. This method, however, requires that the soft material be dumped in some other place which may result in the environmental degradation of the dump site.

A special plant could be constructed at great expense and labor to de-water the slimy soft sedimentary material and treat it so that it was no longer harmful or odiferous. The material would generally have to be transported to the site of the plant at great cost. The bad orders caused by the slimy material would cause "secondary polution" along the transportation route and at the site of the plant.

Another conventional practice used to reclaim land is to compress the high water content sedimentation in situ. For example, sand drains are placed in the area and the sediment is compressed by overlaying the area with sand or soil while draining out the water. Another method is referred to as the fagot-sheet process. In this process, the treatment area is surrounded by walls, the overlaying water is drained off, and the soft slimy deposit of soft sediment material is covered by sheeting material such as canvas. Sand or soil is then deposited on the canvas for compressing the slimy deposit to force the water out of the fluidized slimy deposit.

It is technically very difficult, however, to compress the soft sediment having a very high water content by means of the sand-drain or fagot-sheet process. In order to provide proper consolidation of the soft sediment, it is actually necessary to process the slime by a primary water treatment process. Such processing is practially uneconomical in most instances.

SUMMARY OF THE INVENTION

The present invention is to provide a method for improving or reclaiming rivers, harbors or other waterways which have large deposits of soft sedimentation with a high percentage of water, sometimes referred to as slimy sedimentation, in which the drawbacks of the conventional methods just described are eliminated.

The method according to the present invention comprises the steps of demarcating a compartment in the river, harbor or waterway by means of partition walls; backfilling portions of the compartment adjacent the sides with a stable material which is heavier than the soft sedimentation so as to displace the soft material with a high water content toward the middle of the compartment; and then agitating and treating the soft sedimentation with a substance which will permeate, harden and stabilize the sedimentation deposit. The deposit is treated with a water layer still overlying the slimy deposit.

Since the entire process, including the hardening treatment step takes place while still retaining a layer of water over the entire site; the bad odors which normally emanate from the mixing and agitation of the slimes with the cement are prevented.

The overlying layer of water may also permit the floatation of a work boat for use in the step of hardening the soft sediment. This is especially important where the compartment is very wide and it is impossible to work from the coastal edge even after depositing the sand or stable soil along the edge of the compartment.

The main object of the present invention is to provide an economical process for hardening in situ soft slimy deposits of very high water content which are present in rivers, harbors and other waterways.

Another object of the present invention is to provide a further step in the process above described which will prevent harmful components of the sedimentation deposit from penetrating the earth beneath the waterway and thereby contaminating subterranean water. Such penetration normally will occur during the adding of the hardening agent when the deposit is agitated.

Another object is to provide stable dikes which can support equipment which is used to apply the hardening agent to the final consolidated mass of slimy soft sediment.

For a more detailed understanding of this invention and still further objects and advantages, reference will be made to the following description and accompanying drawings and to the claims in which the new and novel features of this invention are set forth.

BRIEF DESCRIPTION OF THE DRAWINGS

The accompanying drawings illustrate the use of the method of the present invention in improving and reclaiming a river.

FIG. 1 is a plan view of a demarcated portion of a river using the method of the present invention.

FIG. 2 is a vertical sectional view taken laterally of the river shown in FIG. 1 showing the stage of the process after the walls have been placed across the river.

FIG. 3 is a vertical sectional view taken laterally of the river shown in FIG. 1 showing the stage of the process after the sand or stabilizated soil material has been backfilled along the banks of the river.

FIG. 4 is a plan view of the river at the same stage as illustrated in FIG. 3.

FIG. 5 is a sectional view similar to FIG. 2 on a slightly larger scale, showing a further stage in the process; namely the hardening of the soft slimy sediment.

FIG. 6 is a sectional view similar to FIG. 3 showing an ultimate shape after completion of the process with the river completely filled and the land reclaimed.

FIG. 7 is a sectional view similar to FIG. 3 showing another ultimate shape after completion of the process with a portion of the river still filled with water.

FIG. 8 is a plan view similar to FIG. 4 but showing still another form of the process with lateral dikes subdividing the compartment to be treated.

DESCRIPTION OF THE PREFERRED EMBODIMENTS

Figure 9:
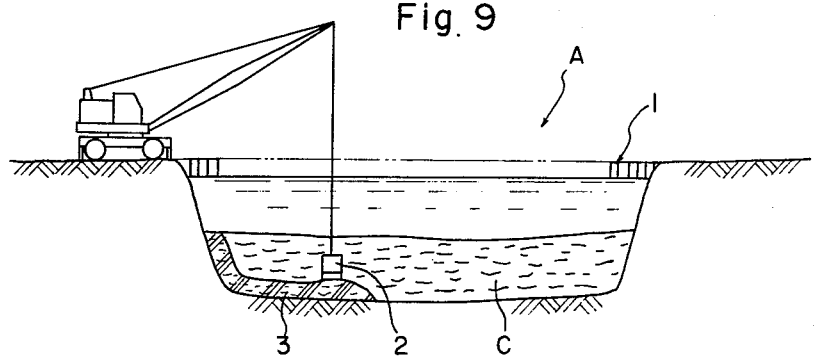
FIGS. 9 - 12 are all vertical sectional views taken laterally of the river shown in the previous figures showing the respective process steps previously illustrated, but with the addition of the further step of placing an additional layer of material at the bottom and a portion of the sides to prevent harmful components of the slimy sediment deposit from penetrating the bottom of the chanel and reaching subterranean water.
Figure 10:
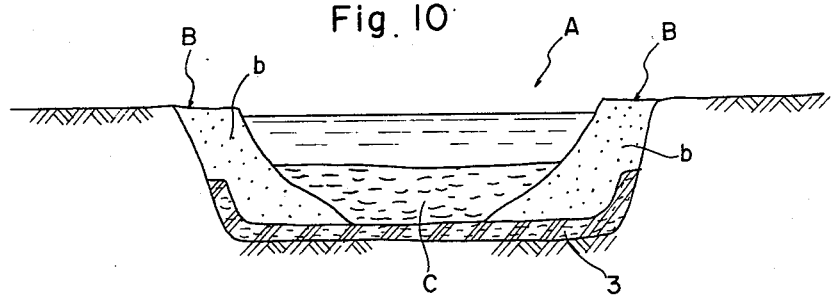

The method of the present invention consists of the following steps which are set forth in chronological order.

First, as shown in FIGS. 1 and 2, a closed compartment or chamber designated area (A) is formed in the river, watercourse or harbor by placing partition walls 1, such as sheet piles across the river at an upstream and a downstream location.

Second, suitable fill material b is deposited along the boundry of Area (A) (in the illustration, only along both banks of the river). The fill material may be sand or soil which will build up a surface of sufficent bearing strength to support heavy machines which can travel thereon. The backfilling of the stable material is deposited in successive vertical and lateral layers so that the soft sediment material (C) which is in a fluidized state is gradually displaced by the heaver solid material and forced to move toward the center of the river.

The backfilling with sand or soil at the periphery of the demarcated compartment and its compressing action will force out water from a portion of the material in the mass of soft slimy sedimentation and will thereby sufficiently treat a portion of the fluidized mass so that it will attain sufficient bearing strength. The volume of soft slimy deposit which is displaced into the middle of the compartment and requires the final hardening treatment step will be considerably reduced. The degree to which such reduction occurs will range from about 20 to 33% by weight of the total original soft slimy sediment. The expensive hardening agent, as for instance cement, required for the necessary hardening of the slimy soft sediment is thereby saved. A part of the labor cost of applying the hardening agent to the slimy mass is also saved.

Third, the mass of soft semi-fluid sediment material (C) is treated by a process which causes the entire mass to harden in situ in the middle of the river. The process is carried on beneath a layer of water (D) overlying the mass (C). The process uses equipment which agitates the slimy mass (C) while admixing the mass with a hardening agent. In performing this treatment, a working ship (E), floating on the water layer (D) as in the illustration may be used, or a land vehicle may be used which is operated on the backfilled material (B). In both instances, means 2 supported from the boom of the crane supplies the hardening agent and agitates the mass (C). Means 2 is operated vertically through the mass (C), as shown in FIG. (C), a section at a time as it moves laterally across the mass to the opposite bank of the river.

Fourth, after completion of the hardening of the mass (C), into a consolidated formation (C'), a layer of soil (F) may be deposited on the consolidated formation (C') and surface B of backfill (b) to provide a stable surface for land reclamation capable of being used for recreation, erection of buildings and other structures. (See FIG. 6).

Fifth, if it is desired to retain a watercourse, the upper surface of the consolidated formation (C') may be leveled or prepared in any proper shape during the hardening treatment as shown in FIG. 7. The banks of the watercourse may be provided with suitable erosion protection.

The fill material (b) set forth in step 2 supra, may be various materials such as soil or sand from another construction site such as the materials from trenching or tunneling operations. The material may even be waste rubble from building demolition work, street repair work or the like.

In performing the hardening treatment of step 3, supra, it is preferable that the water layer (d) be as deep as possible. When required, i.e. when the deposit (C) of displaced slimy sediment is very large, water may be brought from outside the treatment Area (A) by pumping and added to the layer of water (D).

As a further modification of the hardening treatment of the deposit (C) in step 3, it may be desirable to admix sand or suitable soil with the soft sediment material while the mass is being agitated. The addition of the soil or sand will further enhance the stability or the bearing strength of the hardened formation (C').

The cost of providing surface (B) along the periphery of the Area (A) is quite low since, as stated previously, waste material from other construction projects can be used. Further, the fill material (b) may be deposited quickly and in very large volume. The fill (b) must be of selected material which can be compacted sufficiently to attain a bearing strength capable of supporting the large land machines such as bulldozers and traveling cranes used in backfilling material (b) and carrying out the hardening process of step 3.

Since the hardening treatment in changing the soft mass (C) to a stable formation (C') is performed in situ there is a substantial savings in overall cost and a substantial shortening of the working time in comparison with conventional methods which dredge the soft sediment material, dispose of the material at another location and replace the material with stable material transported from a distant location.

Referring to FIG. 8, an alternate process is illustrated for performing the process of the present invention on areas which are very wide or a work boat cannot be brought in and the middle of the work area (A) cannot be reached by a crane from the work surface (B) to perform the step of hardening the mass (C). In this event, the fill (b) may be placed in a lattice or crisscross pattern. The fill (b) is placed across the river in addition to along the banks thereby creating subcompartments (a). Thus the land machines for use in the hardening step may work from surfaces (B) which extend across the river from bank to bank.

In the event that the deposits (C) contain industrial wastes or chemicals which might leach through the bottom of the waterway and contaminate the subterranian waters therebelow during the agitation of the deposit (C) which occurs during the hardening process set forth in step 3 supra, an additional step as illustrated in FIGS. 9 - 12 may be employed. In this step, a layer 3 is formed along the bottom and sides of the channel which will prevent the flow of water therethrough.

Figure 11:
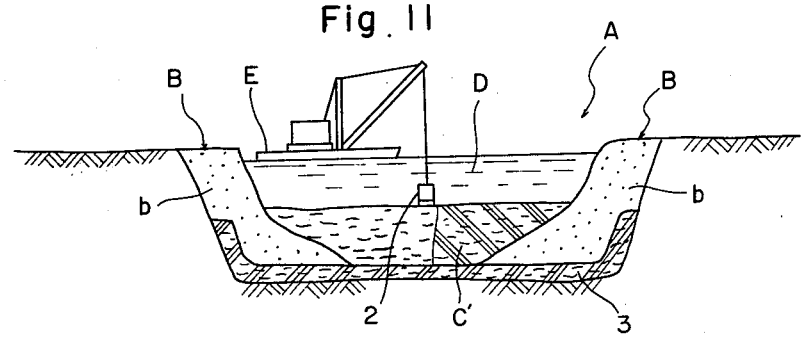
Figure 12:
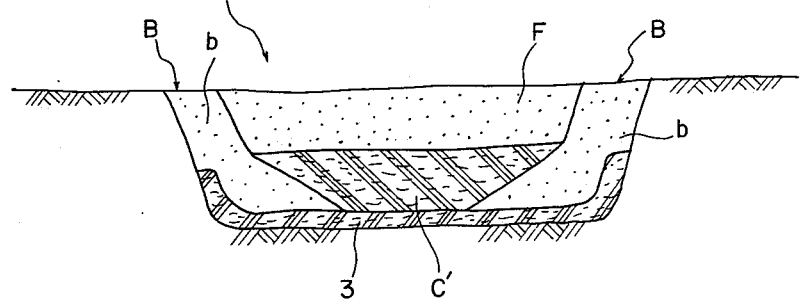

The first step is identical to the first step previously described in which the treatment Area (A) is delinated by walls 1. Next, as shown in FIG. 9, the water-flow-intercepting layer 3 is formed by means 2 which is the same means as previously described in step 3 supra and illustrated in FIG. 5. In forming the layer 3, however, a different agent must be used which will rapidly form the layer 3. Suitable agents are water glass, cement or the like. These agents comingle, upon agitation, with the bottom portion of the deposit (C) and form the layer 3. Upon completion of the step of forming layer 3, the remaining steps exactly as above described, starting with step 2, supra are performed. Briefly, fill (b), such as sand, is placed along the banks of the river so as to displace the soft sediment material to the middle of the river. The mass (C) is then hardened as illustrated in FIG. 11 by introducing a hardening agent such as cement while agitating the mass (C) to consolidate and form the stable mass (C'). As illustrated in FIG. 12, a stable soil layer (F) may be deposited to reclaim the land.

The water-flow-intercepting layer 3 previously described which is located between the soft sediment mass (C) and the earth substrate and placed before the step of agitating the mass (C) during the hardening process prevents the penetration of any harmful component of the mass (C) into the earth formation below the channel. This will prevent the secondary polution; namely, the contamination of the subterranean water.

What is claimed is:

1. A method of improving river, harbor or other waterway channels having large deposits of soft sediment in a fluidized state therein, by contouring and stablizing the channel, comprising the steps of:
    1. delineating a portion of the waterway by forming a watertight compartment (A) by means of partition walls;
    2. depositing a stable fill material (b) such as sand or soil on at least two opposite sides adjacent the boundaries of said compartment causing said stable fill to mix with said fluidized sediment and to force out water from a portion of said sediment thereby causing a portion of said sediment to attain sufficient bearing strength and whereby said stable fill causes the remainder of said sediment in the bottom of said channel to be displaced from the areas adjacent the boundaries of said compartment to the mid-portion of said compartment in a consolidated mass (C); and said stablized material is deposited in sufficient quantity to form a stable surface (B) upon which earth machines may work in carrying out further process steps; and
    3. hardening said entire remaining consolidated fluidized mass (C) into a hardened mass (C') by agitating said fluidized mass (C) and introducing a hardening agent into said fluidized mass (C) while said mass (C) and hardened mass (C') are covered by a layer of water (D).

2. The method of claim 1 including an additional step which is performed after completion of the step of delineating the compartment (A) and prior to the depositing of fill material (b) comprising:
    1. forming a layer (3) along the bottom and sides of said compartment by agitating and introducing a hardening agent into a thin layer of said soft sediment deposit, said layer providing a barrier to the flow of water therethrough and thereby preventing contamination of the soil and ground water below said channel.

3. The method of claim 2 including an additional step comprising:
    1. depositing said fill (b) in a lattice or crisscross pattern thereby dividing said compartment (A) into a plurality of subcompartments (a).

4. The method of claim 2 including two additional steps, to be performed after completion of forming said consolidated hardened mass (C') comprising:
    1. removing said layer of water (D) as by pumping; and
    2. depositing a layer of sand, soil or other stable material (F) on said consolidated hardened mass (C').

5. The method of claim 2 which involves an additional step, to be effected prior to complete hardening of the consolidated mass (C) into hardened mass (C') comprising:
    1. leveling or forming the upper surface of said hardening mass (from C to C') into a selected contour.

6. The method of claim 1 including an additional step comprising:
    1. depositing said fill (b) in a lattice or crisscross pattern thereby dividing said compartment (A) into a plurality of subcompartments (a).

7. The method of claim 1 including two additional steps to be performed after completion of forming said consolidated hardened mass (C') comprising:
    1. removing said layer of water (D) as by pumping; and
    2. depositing a layer of sand, soil or other stable material (F) on said consolidated hardened mass (C').

8. The method of claim 1 which involves an additional step, to be effected prior to complete hardening of the consolidated mass (C) into hardened mass (C') comprising:
    1. leveling or forming the upper surface of said hardening mass (from C to C') into a selected contour.

* * * * *